(12) United States Patent
James et al.

(10) Patent No.: US 9,652,506 B2
(45) Date of Patent: May 16, 2017

(54) PROVIDING DATA EXPERIENCE(S) VIA DISPARATE SEMANTIC ANNOTATIONS BASED ON A RESPECTIVE USER SCENARIO

(75) Inventors: Alex James, Sammamish, WA (US); Michael Pizzo, Bellevue, WA (US); Pablo Castro, Redmond, WA (US); Mike Flasko, Duvall, WA (US); Lance Olson, Sammamish, WA (US); Jason Clark, Woodinville, WA (US); Sid Jayadevan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 737 days.

(21) Appl. No.: 13/329,137

(22) Filed: Dec. 16, 2011

(65) Prior Publication Data

US 2013/0159829 A1 Jun. 20, 2013

(51) Int. Cl.
 *G06F 3/00* (2006.01)
 *G06F 17/30* (2006.01)
(52) U.S. Cl.
 CPC .............................. *G06F 17/30525* (2013.01)
(58) Field of Classification Search
 CPC .. G06F 8/70; G06F 11/3676; G06F 17/30705; G06F 17/30713; G06F 17/30861; G06F 17/30525
 USPC .................................. 715/234, 243, 254, 255
 See application file for complete search history.

(56) References Cited

U.S. PATENT DOCUMENTS

| | | | |
|---|---|---|---|
| 2008/0005147 A1 | 1/2008 | Khushraj | |
| 2009/0281982 A1 | 11/2009 | Nigul | |
| 2010/0011282 A1 | 1/2010 | Dollard | |
| 2010/0017380 A1* | 1/2010 | Naibo | G06F 17/30398 707/E17.136 |

(Continued)

OTHER PUBLICATIONS

Zhixian Yan et al. "SeMiTri: A Framework for Semantic Annotation of Heterogeneous Trajectories", Published Date: Mar. 24, 2011, Proceedings: 14th International Conference on Extending Database Technology, EDBT/ICDT '11, http://citeseerx.ist.psu.edu/viewdoc/download?doi=10.1.1.194.1123&rep=rep1&type=pdf.

(Continued)

*Primary Examiner* — Kyle Stork
(74) *Attorney, Agent, or Firm* — Wade IP Law LLC

(57) ABSTRACT

The subject disclosure relates to techniques for providing data experience(s) via disparate semantic annotations based on a respective user scenario. An annotation component can synthesize semantic information for respective data types of data set(s), associate the semantic information with the respective data types to obtain respective data annotations, and in response to receiving a query from a client, send at least a portion of the respective data annotations to the client. Further, a data aggregation component can aggregate the respective data annotations and at least a portion of the data set(s). Other embodiments relate to performing, via an application, operations utilizing a data type based on respective semantic annotations associated with the data type. Yet other embodiments relate to receiving external data annotation(s) and associating the external data annotation(s) with portion(s) of the respective data types to derive portion(s) of the respective semantic annotations.

22 Claims, 12 Drawing Sheets

(56) References Cited

U.S. PATENT DOCUMENTS

| | | | | |
|---|---|---|---|---|
| 2010/0241431 A1* | 9/2010 | Weng | ............... | G06F 3/038 |
| | | | | 704/257 |
| 2010/0241978 A1 | 9/2010 | Genovese | | |
| 2010/0325540 A1 | 12/2010 | Biazetti | | |
| 2011/0137917 A1 | 6/2011 | Boland | | |
| 2011/0283260 A1* | 11/2011 | Bucuvalas | ......... | G06F 11/3664 |
| | | | | 717/124 |
| 2012/0078955 A1* | 3/2012 | Boguraev | ............ | A61B 5/00 |
| | | | | 707/769 |
| 2012/0095973 A1* | 4/2012 | Kehoe et al. | ............... | 707/694 |
| 2012/0112995 A1* | 5/2012 | Maeda | ................ | G06F 3/017 |
| | | | | 345/156 |

OTHER PUBLICATIONS

Bremer et al. "Web Data Indexing Through External Semantic-Carrying Annotations", Proceedings: 11th IEEE Int'l Workshop on Research Issues on Data Engineering: Document Management for Data Intensive Business and Scientific Applications (RIDE-DM'2001), IEEE Computer Society, pp. 69-76, 2001; http://citeseerx.ist.psu.edu/viewdoc/download?doi=10.1.1.163.5039&rep=rep1&type=pdf.

Farrell et al. "Semantic Annotations for WSDL and XML Schema"—Published Date: Aug. 28, 2007; http://www.w3.org/TR/sawsdl/.

* cited by examiner

PROVIDING DATA EXPERIENCE(S) VIA DISPARATE SEMANTIC ANNOTATIONS BASED ON A RESPECTIVE USER SCENARIO

TECHNICAL FIELD

The subject disclosure generally relates to providing data experience(s) via disparate semantic annotations based on a respective user scenario.

BACKGROUND

Data-driven applications perform functions/operations within an operating environment based on binding data to such functions/operations via source code. As such, the source code is compiled/interpreted for performing the operation within the operating environment, or platform. To perform the operation on a different platform, the data is bound or associated to other functions/operations via other source code that is compiled/interpreted for the other platform. For example, a web browser can display data on a particular platform based on information embedded in a hypertext markup language (HTML) file. Such information can include extensible markup language (XML), which can bind data to functions/operations that are performed via the web browser.

However, data-driven applications do not enable performing an operation via a platform without binding data to domain-specific logic within a data-driven application.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with referencing data via disparate semantic annotations based on a respective user scenario.

For instance, an embodiment includes an annotation component that can synthesize, infer, determine, receive, etc. semantic information for respective data types of data set(s), associate the semantic information with the respective data types to obtain respective data annotations, and in response to receiving a query from a client, send at least a portion of the respective data annotations to the client. Further, a data aggregation component can aggregate the respective data annotations and portion(s) of the data set(s), e.g., drawing upon one or more data stores.

In at least one embodiment, a data annotation of the respective data types indicates a characteristic associated with a data set of the respective data types, a property of the data type, a description of the data type, a description of a use of the data type, and/or a format for the data type.

In one or more other embodiments, a service application can publish, based on the query, at least a portion of (1) the respective data annotations via an XML; and/or (2) the data set(s) via feed(s) associated with a type definition, entry, etc. for a structured record of a data type of the data set(s).

In yet another embodiment, the service application can publish, based on the query, a first link and/or a second link. The first link, e.g., a Uniform Resource Identifier (URI), can indicate a file including the XML; the second link, or another URI, can indicate one or more collections of respective feeds associated with respective record types.

In an embodiment, the annotation component can receive, synthesize, infer, determine, etc. service semantic information, or service annotations, for respective service applications, or data services. Further, the annotation component can associate the service semantic information with the respective service applications to obtain respective service annotations. In response to receiving a query, the annotation component can communicate at least a portion of the respective service annotations to the client. In one or more embodiments, the service annotation identifies a characteristic of a service application of the respective service applications, a property of the service application, a description of the service application, a use for the service application, a characteristic of data associated with the service application, and/or a characteristic of an action associated with the data.

In another embodiment, the annotation component can receive external data annotation(s), e.g., separate from a data service or service application that is associated with the annotation component. Further, the annotation component can associate the external data annotation(s) with portion(s) of the respective data types to derive portion(s) of the respective data annotations. In an embodiment, the external data annotation(s) can be associated with, or can be applied to, a data type that is associated with, supported by, etc. multiple data services.

In one embodiment, an interface component stored in a computer readable storage medium can receive information associated with data types of data set(s) from a data service. Such information can include data feeds that are associated with the data types and/or respective links associated with the data types. Further, the interface component can send a query for first semantic information associated with the data types to the data service. The first semantic information can include a characteristic associated with the data type, a property of the data type, a description of the data type, a description of a use, e.g., which is associated with the first operation of the data type, or a format for the data type. Furthermore, the interface component can receive, based on the query, the first semantic information from the data service. Moreover, an application component can perform, based on the first semantic information, a first operation utilizing a data type of the data types.

In another embodiment, the interface component can receive second semantic information from the data service. Further, the application component can perform, via a first application, the first operation utilizing the data type based on the first semantic information; and perform, via the first application, a second operation utilizing the data type based on the second semantic information. In yet another embodiment, the application component can perform the second operation via a second application.

In an embodiment, the application component can perform the first operation using the data type based on a first library associated with the first semantic information, and perform the second operation using the data type based on a second library that is associated with the second semantic information.

Another non-limiting implementation can include receiving, via an annotation component of at least one computing device, semantic information for annotating a data type of a data set; annotating, based on the semantic information, the data type to obtain a data annotation; and aggregating the data annotation with one or more portions of respective data set(s), e.g., drawing upon one or more data stores. Then, in response to receiving an input, information associated with the data annotation is output, e.g., to a client.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Overview

As indicated in the background, an application performs an operation on a platform by binding data to a specific form via source code of the application.

In consideration of these and other deficiencies of the conventional technologies, the subject matter disclosed herein relates to providing a mechanism for assigning semantic meaning to data for a respective scenario.

In one embodiment, a system comprises an annotation component configured to synthesize semantic information for respective data types of one or more data sets; associate the semantic information with the respective data types to obtain respective data annotations; and in response to receiving a query from a client, send at least a portion of the respective data annotations to the client. Further, a data aggregation component can aggregate the respective data annotations and at least a portion of the one or more data sets.

In another embodiment, a system comprises an interface component stored in a computer readable storage medium configured to: receive information associated with data types of at least one data set from a data service, send a query for semantic information associated with the data types to the data service, and receive, based on the query, the semantic information from the data service; and an application component configured to perform, based on the semantic information, a first operation utilizing a data type of the data types.

In yet another embodiment, a method comprises receiving, via an annotation component of at least one computing device, semantic information for annotating a data type of a data set; annotating, based on the semantic information, the data type to obtain a data annotation; aggregating the data annotation with one or more portions of the data set; and in response to receiving an input, outputting information associated with the data annotation.

Figure 1:
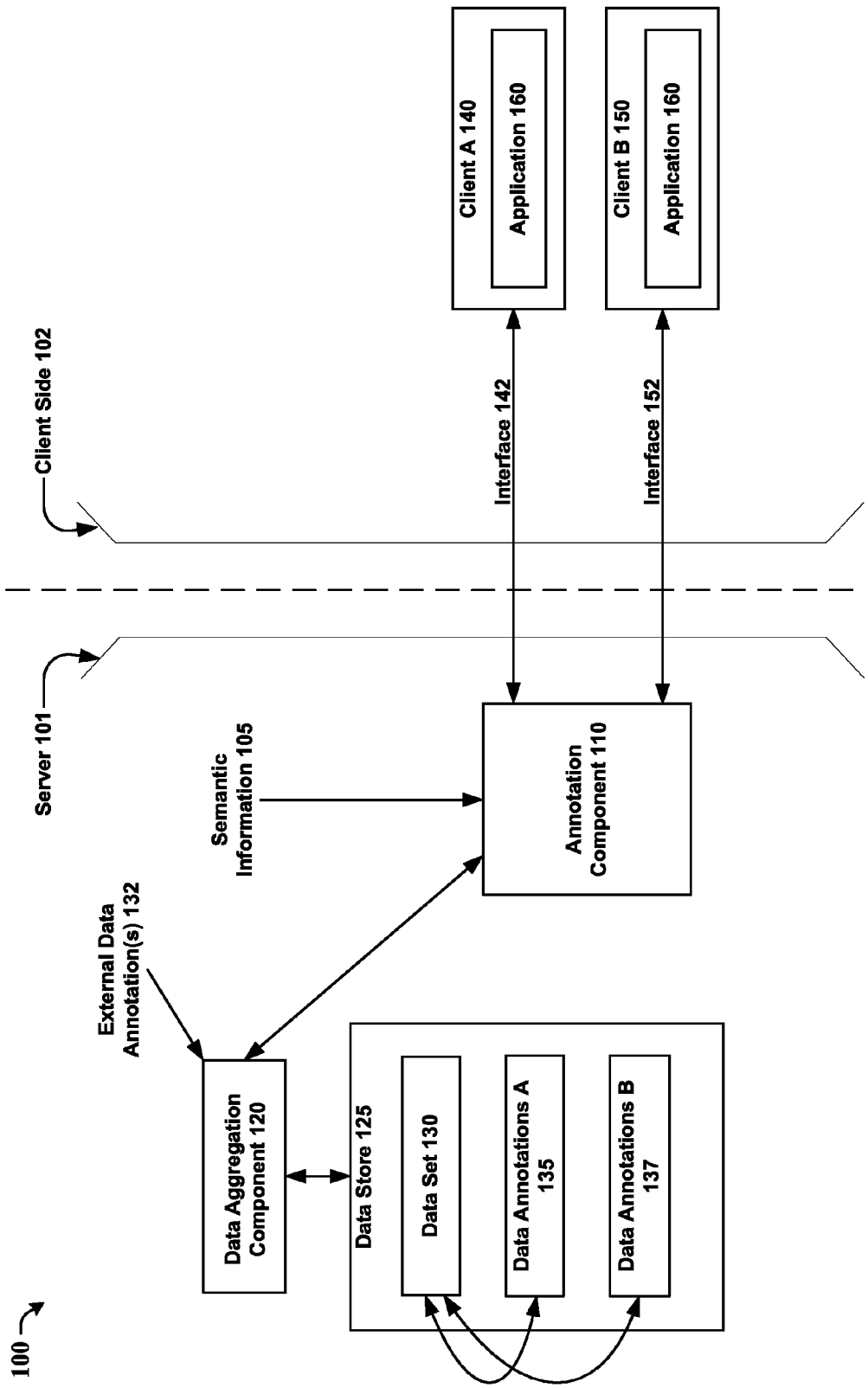
FIG. 1 illustrates an exemplary data services environment including an annotation component for referencing data based on a respective scenario, according to an embodiment.

Such techniques enable referencing data via disparate semantic annotations based on a respective user scenario associated with a platform, or application environment Assigning Semantics to Respective Data Types of a Data Set Referring now to FIG. 1, data services environment 100 is depicted including annotation component 110 that is associated with server 101. In one embodiment, annotation component 110 can assign semantic meaning to data types of data set 130 for respective user scenarios. For example, annotation component 110 can assign semantic meaning to the data types by utilizing data annotations A 135 and data annotations B 137. In one example, data aggregation component 120 can be configured to store data annotations A 135, data annotations B 137, and data set 130 in data store 125. In an aspect, data store 125 can include more than one data storage device communicatively coupled to data aggregation component 120.

In an embodiment, annotation component 110 can be configured to synthesize, infer, determine, receive, etc. semantic information 105 for the data types. Further, annotation component 110 can be configured to associate, via data aggregation component 120, semantic information 105 with the data types to obtain respective data annotations, e.g., (1) data annotations A 135, e.g., associated with first semantic information associated with a first scenario, e.g., client A 140; and (2) data annotations B 137, e.g., associated with second semantic information associated with a second scenario, e.g., client B 150.

In one aspect, annotation component 110 can be configured to send at least a portion of the respective data annotations to a client, e.g., client A 140, client B 150, etc. In another aspect, data aggregation component 120 can be configured to aggregate the respective data annotations and at least a portion of data set 130, for example, utilizing data store 125, disparate and/or distributed data storage devices and/or data sources, etc.

In an aspect, a data annotation of data annotations A 135, data annotations B 137, etc. can indicate a characteristic associated with a data type of the data types, a property of the data type, a description of the data type, a description of a use of the data type, and/or a format for the data type. As such, in one aspect, application 160 can perform first operation(s) via the first scenario, or first user scenario, based on the first semantic information, and perform second operation (s) via the second scenario, or second user scenario, based on the second semantic information. Thus, unlike conventional technologies, server 101 can enable application 160 to perform respective operations via different platforms, e.g., client A 140, client B 150, etc. without binding the data types of data set 130 to a specific form via source code, e.g., of application 160.

In one embodiment, data aggregation component 120 can be configured to receive external data annotation(s) 132, e.g., specified separately from a data service associated with server 102. Further, annotation component 110 can associate, via data aggregation component 120, external data annotation(s) 132 with at least a portion of the data types to derive at least a portion of the respective data annotations. As such, annotation component 110 can provide an illusion that external data annotations(s) 132 are specified via a data service that is associated with server 101. In an embodiment, at least a portion of external data annotation(s) 132 can apply to multiple data services. For example, the portion of external data annotation(s) 132 can apply to a type, e.g., a Movie, that is supported by, associated with, etc. multiple data services, for example, an internet-based movie rental service and an internet movie data base (IMDb). As such, the portion of external data annotation(s) 132 can specify data experience(s) for multiple client environments, for multiple data services, etc.

Figure 2:
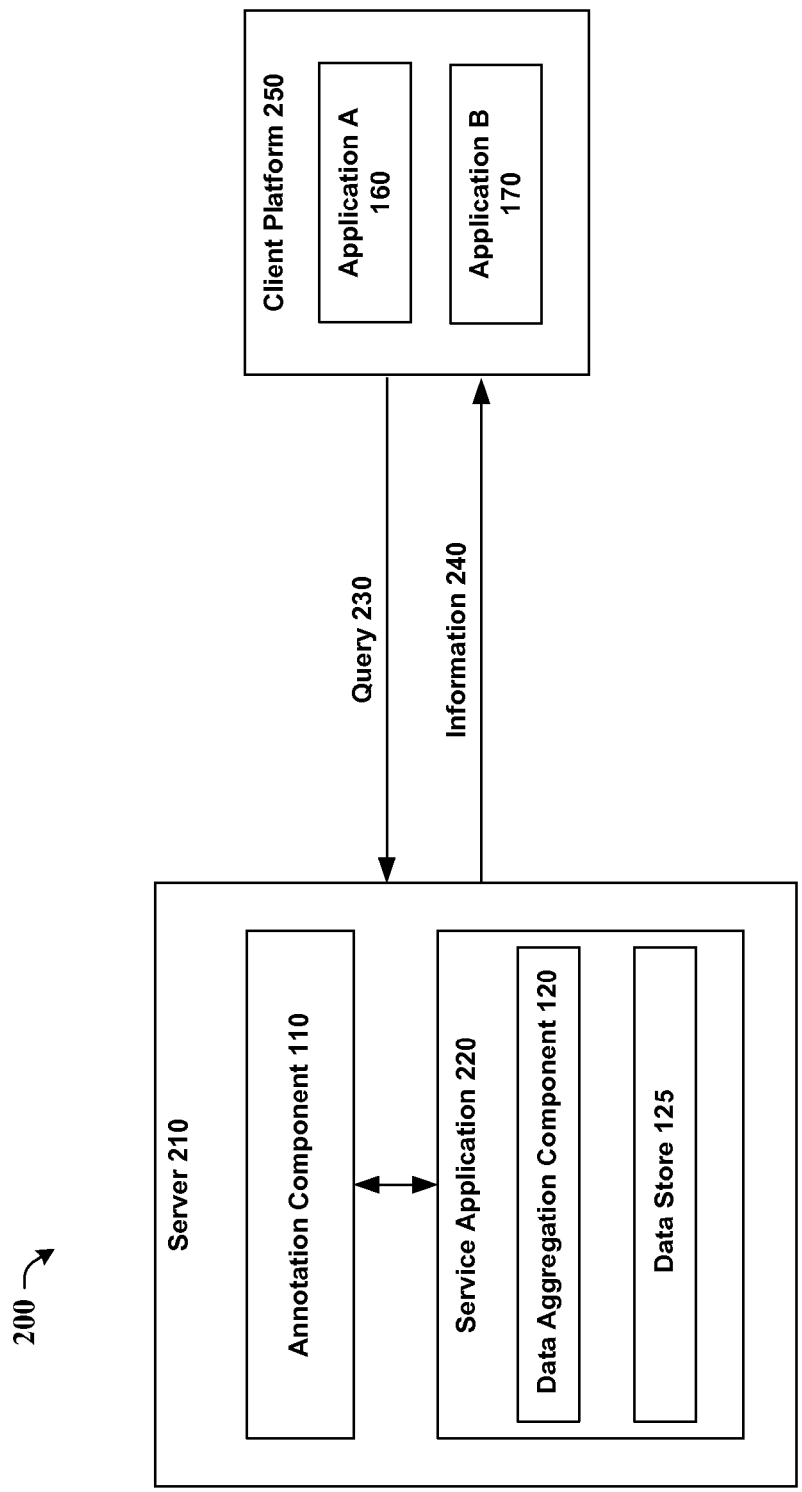
FIG. 2 illustrates an exemplary data services environment including a service application for referencing data based on a respective scenario, according to an embodiment.

In another embodiment illustrated by FIG. 2, the first semantic information can be associated with application A 160 of client platform 250. Further, the second semantic information can be associated with application B 170 of client platform 250. As such, in an aspect, application A 160 can perform first operation(s) via a first scenario based on the first semantic information, and application B 170 can perform second operation(s) via a second scenario based on the second semantic information. In yet another embodiment, application B 170 can be included in a client platform that is different from client platform 250 and communicatively coupled to server 210.

In an example, the data types of data set 130 can include information associated with respective movies, e.g., associated with a data base of movies, and client platform 150 can be associated with an Internet-based application, or data service. A first user of the Internet-based data service can be a consumer utilizing application A 160 to find movies to rent, download, etc. via the Internet. Further, a second user of the Internet-based data service can be a movie director utilizing application B 170 to scout, search for, etc. independent actor(s) to hire for a new movie production. As such, the consumer and/or the movie director can send movie/actor queries via query 230 to service application 220 of server 210, and receive results associated with such queries via information 240. In one example, the movie queries can include a request to find, sort, etc. movies by actor, genre, etc. In another example, the actor queries can include a request to find movies in which an actor played supporting roles, a success rate of movies in which the actor played a leading role, etc.

In one aspect, service application 220 can be a representational state transfer (REST)-based data service that can enable a client, e.g., client platform 250, to request service application 220 to perform an operation associated with a resource, e.g., data set 130. Referring to the example above, service application 220 can receive the movie queries and/or the actor queries via hypertext transfer protocol (HTTP) messages, and publish, via information 240, results associated with such queries.

In another aspect, service application 220 can publish, via information 240, at least a portion of data annotations A 135 and/or data annotations B 137 based on respective queries. In one embodiment, such annotations can be published via XML. Referring again to the example above, a data annotation of such annotations can indicate a characteristic associated with a data type, e.g., a movie, a property of the movie, a description of the movie, an actor associated with a movie, etc. As such, the client, e.g., the consumer, the movie director, etc. can determine appropriate queries to perform on data set 130 by reviewing annotations associated with respective client scenarios corresponding to, e.g., the Internet-based data service.

In another embodiment, service application 220 can publish, via information 240, at least a portion of data set 130 via a feed (see e.g. feed 325 below) that is associated with a type definition for a structured record of the data type, or movie. As such, the structured record of the data type can include data indicating one or more characteristics, features, etc. associated with the data type, e.g., actor(s), revenue, rating(s), etc. associated with a movie.

Referencing a Data Set Based on Semantic Annotations Via Open Data Protocol

Open Data Protocol (OData) enables the creation of REST-based data services, which allow resources using Uniform Resource Identifiers (URIs) and defined in an abstract data model, to be published and edited by WWW, or Web, clients using HTTP messages. OData is based on conventions defined in Atom Publishing Protocol (ATOM) and applies Web technologies such as HTTP and JavaScript Object Notation (JSON) to create a protocol that enables access to information from a variety of applications, services, and stores, e.g., relational databases, file systems, content management systems, Web sites, etc.

As such, OData includes feeds, which are collections of typed entries. Each typed entry represents a structured record with a key that has a list of properties. Further, entries can be part of a type hierarchy and can have related entries and related feeds via links. For example, the following URI represents a feed of product entries: http colon slash slash services dot odata dot org slash OData slash OData dot svc slash Products. Simple OData services can include a feed. More sophisticated OData services can have several feeds. Thus, a client can discover such feeds and addresses associated with such feeds by referencing a service document. For example, the following URI identifies a service document for a sample OData service: http colon slash slash services dot odata dot org slash OData slash OData dot svc. Further, OData services can expose service operations that are service-specific functions that accept input parameters and return entries or complex/primitive values.

OData services expose feeds, entries, properties within entries, links, service documents, and metadata documents via URIs in one or more formats, which can be acted on by clients using basic HTTP requests. To enable clients to discover the shape of an OData service, the structure of resources of the OData service, links between the resources, and service operations associated with the resources, an OData service can expose a service metadata document. The service metadata document can describe the data model, or Entity Data Model (EDM), e.g., describing structure and organization of resources associated with the data model, exposed as HTTP endpoints by the OData service.

Figure 3:
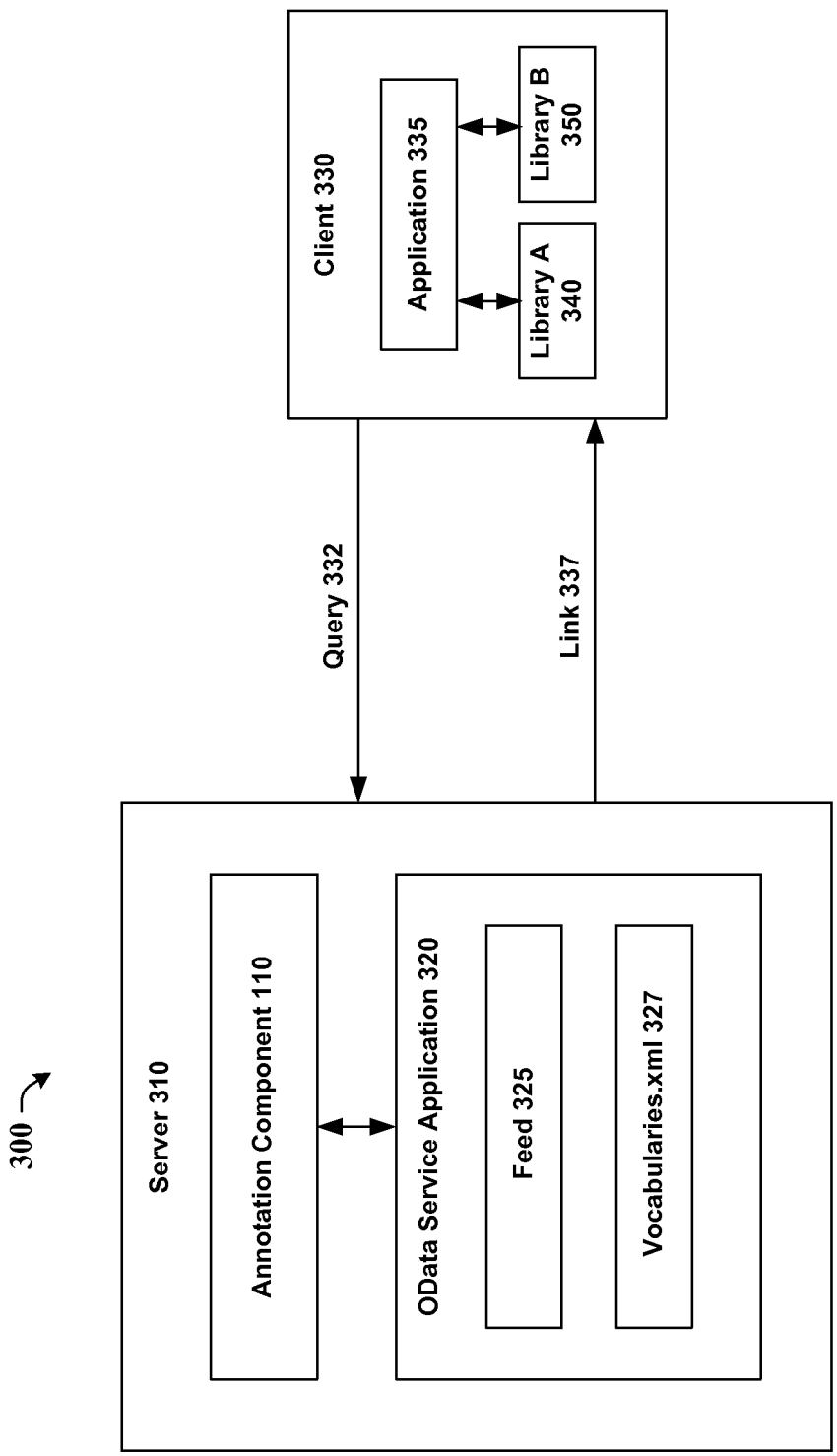
FIG. 3 illustrates another exemplary data services environment including a service application for referencing data based on a respective scenario, according to an embodiment.

Now referring to FIG. 3, server 310 is depicted including OData service application 320 for referencing data based on a respective scenario, according to an embodiment. OData service application 320 can be configured to expose feeds, e.g., feed 325, entries, properties within entries, links, service documents, and/or metadata documents, e.g., vocabularies.xml 327, associated with such feeds based on query 332 received from client 330. For example, OData service application 320 can be configured to publish, based on query 332, one or more links, e.g., link 337, including (1) a first link, e.g., a first URI, indicative of a service metadata document, e.g., vocabularies.xml 327, including the XML; and/or (2) a second link, e.g., a second URI, indicative of the feed, e.g., feed 325.

In one aspect, the XML can describe data annotation(s) of feed 325. As such, and referring again to the example described above, client 330 can receive the first URI, via link 337, indicative of vocabularies.xml 327. Further, the XML can indicate a characteristic associated with a movie, a property of the movie, a description of the movie, an actor associated with a movie, etc. As such, client 330 can determine appropriate queries to perform on feed 325, via application 335, by reviewing the XML based on the first link. Further, server 310 can return, based on such queries, link(s), e.g., the second link, to one or more typed entries associated with feed 325.

In another aspect, application 335 can be communicatively coupled to one or more libraries, e.g., library A 340, library B 350, which are associated with different operations, display strategies, etc. for a data set, e.g., data set 130, feed 325, etc. As such, the one or more libraries can include information associated with respective metadata for performing operations via application 335, e.g., for respective user scenarios. In one embodiment, the one or more libraries can be provided via one device, client, etc. In another embodiment, the one or more libraries can be provided via respective devices.

Figure 4:
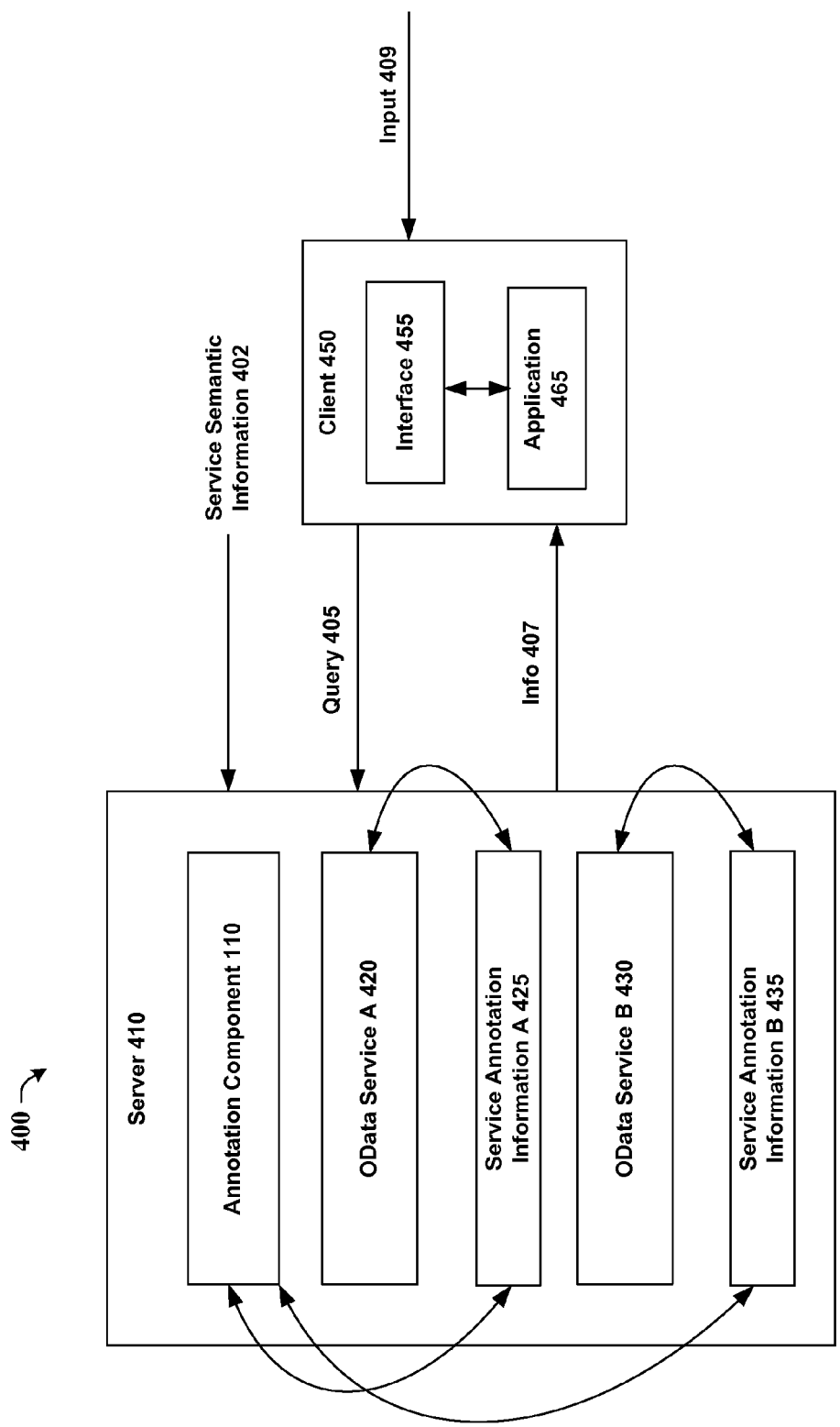
FIG. 4 illustrates an exemplary data services environment including data services according to an embodiment.
Figure 5:
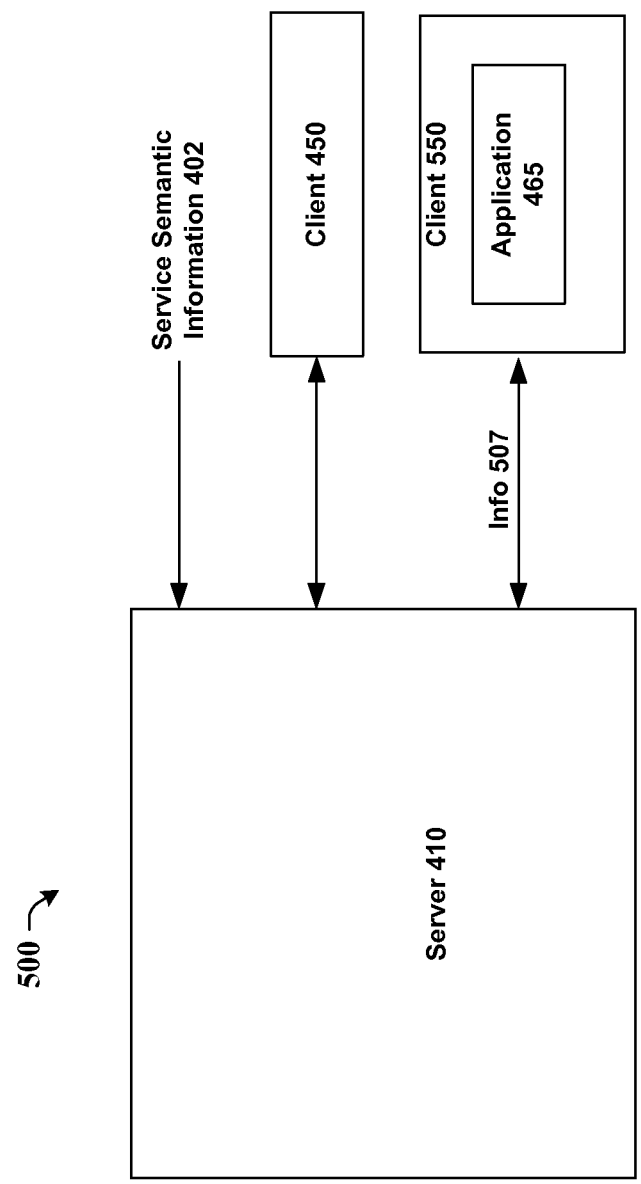
FIG. 5 illustrates another exemplary data services environment including data services.

FIGS. 4 and 5 illustrate exemplary data service environments 400 and 500 including data services, according to an embodiment. Data service environment 400 includes server 410 including OData service A 420 and OData service B 430 communicatively coupled to annotation component 110. Annotation component 110 can be configured to receive semantic information 402, including service semantic information, or service annotation(s), for respective service applications, e.g., OData service A 420 and OData service B 430. Further, annotation component 110 can be configured to associate the service semantic information with the respective service applications to obtain respective service annotations, e.g., service annotation information A 425, service annotation information B 435, etc.

Furthermore, annotation component 110 can be configured to communicate, via info 407, at least a portion of the respective service annotations to client 450 in response to receiving query 405. In an aspect, the service semantic information can identify a characteristic of a service application of the respective service applications, a property of the service application, a description of the service application, a use for the service application, a characteristic of data associated with the service application, and/or a characteristic of an action associated with the data. As such, client 450 can receive, via interface 455, input 409 for a scenario associated with application 465. Further client 450 can determine service semantic information, based on query 405 and info 407 described above, for performing operation(s) associated with the scenario, e.g., based on service annotation information A 425, service annotation information B 435, etc. For example, in an aspect illustrated by FIG. 5, semantic information 402 can identify common operations performed via a data service, e.g., OData service A 420, OData service B 430, etc. As such, client 550 can determine such operations via info 507, and perform such operations via application 465.

Figure 6:
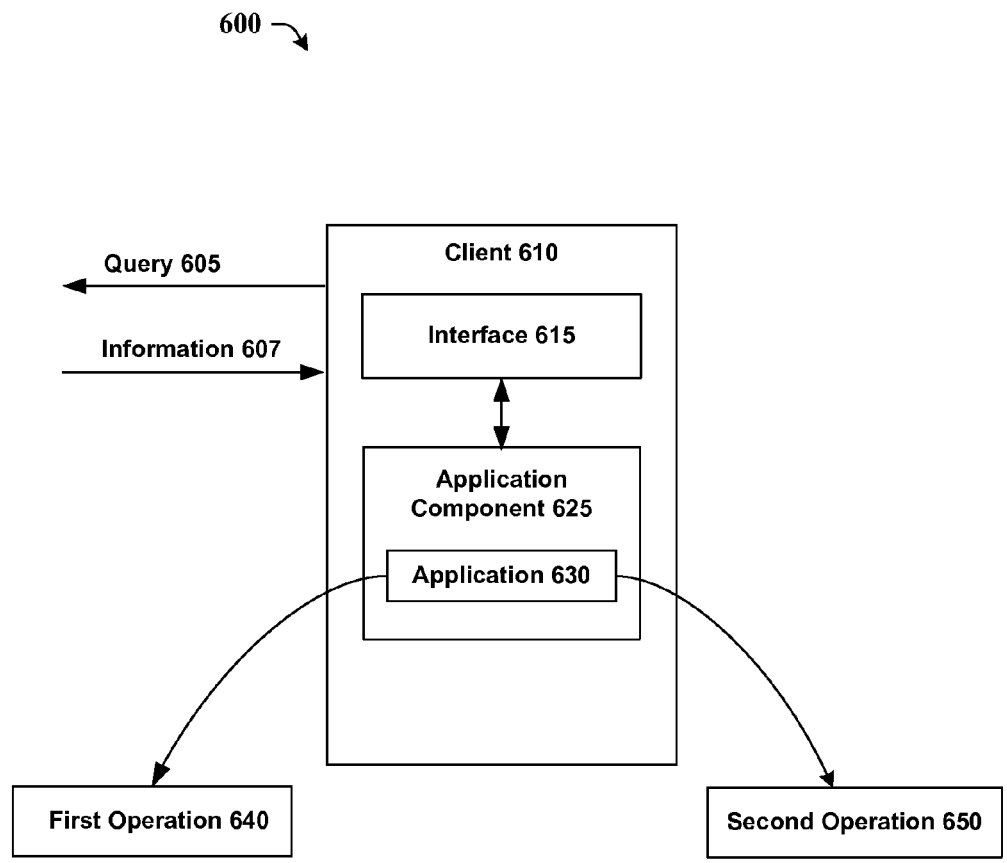
FIGS. 6-8 illustrate exemplary data service environments for referencing data based on a respective scenario associated with a client, according to various embodiments.
Figure 7:
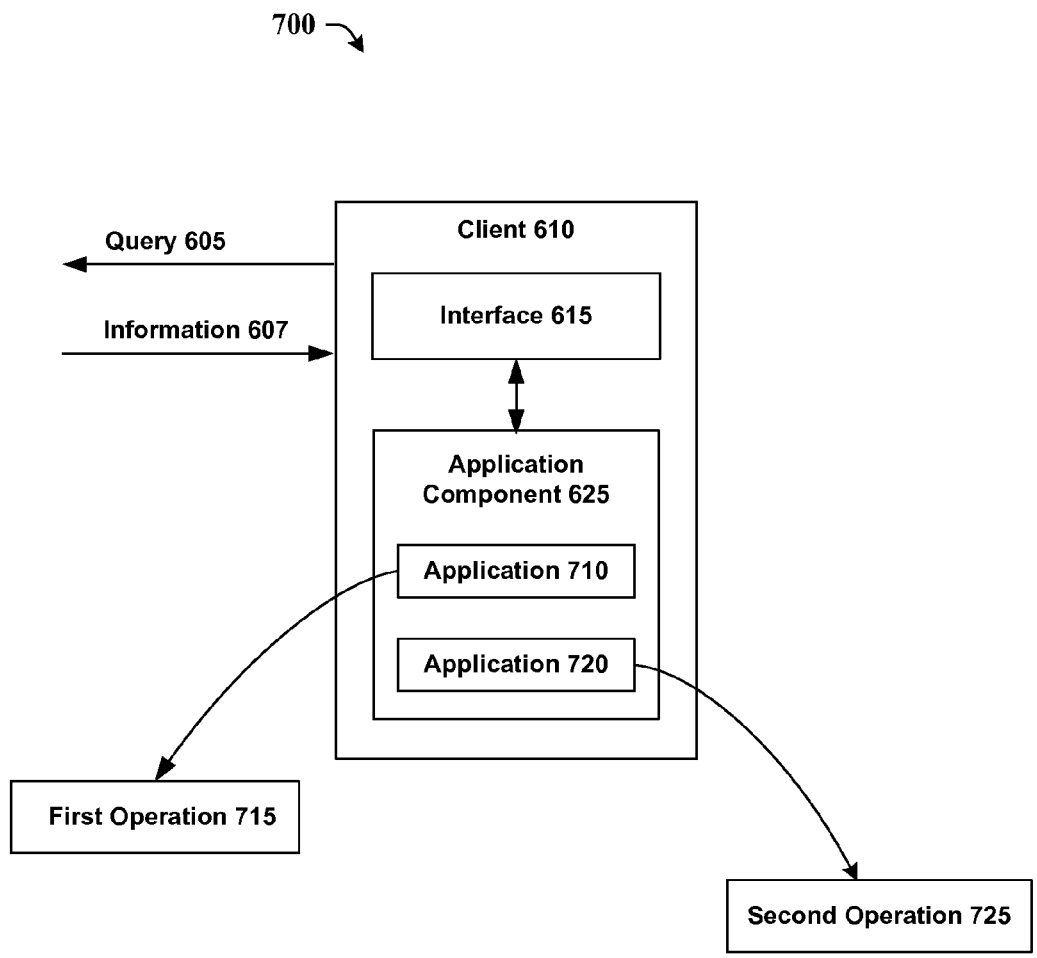
Figure 8:
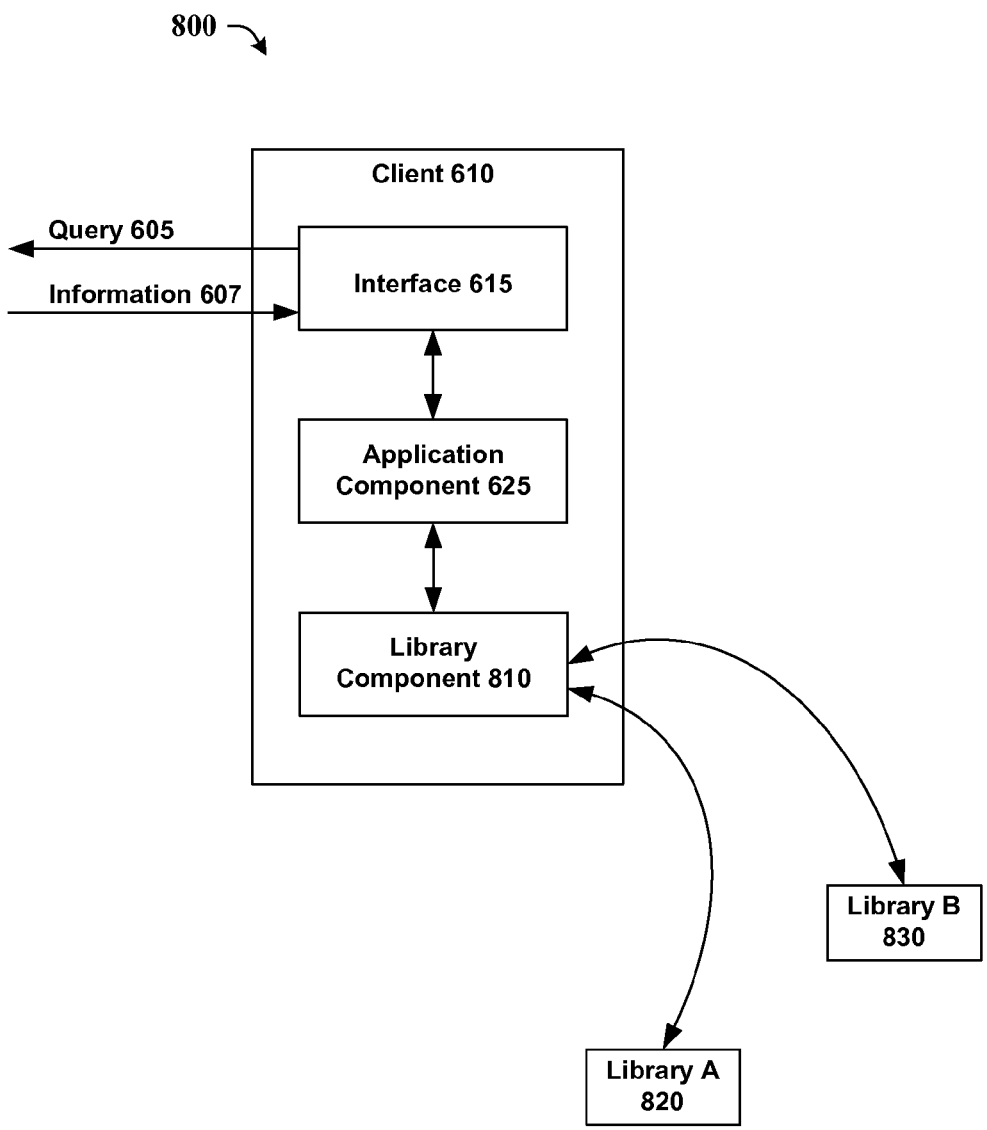

Referring now to FIGS. 6-8, exemplary data service environments (600-800) for referencing data based on a respective scenario associated with client 610 are illustrated, according to various embodiments. As illustrated by FIG. 6, client 610 can include interface component 615 and application component 625. Interface component 615 can be stored in a computer readable storage medium and receive information associated with data types of at least one data set from a data service, e.g., service application 220, OData service application 320, OData service A 420, OData service B 430, etc.

Further, interface component 615 can be configured to send query 605 to the data service for first semantic information associated with the data types, and receive, based on query 605, information 607 including the first semantic information from the data service. In one aspect, information 607 can include a feed, e.g., feed 325, which is associated with a data type of the data types, and/or a link, e.g., URI, link to metadata, etc. that is associated with the data type.

Furthermore, application 630 of application component 625 can be configured to perform, via a first scenario and based on the first semantic information, first operation 640 utilizing a data type of the data types. In another aspect, interface component 615 can be configured to send query 605 to the data service for second semantic information associated with the data types, and receive, based on query 605, information 607 including the second semantic information from the data service. Moreover, application 630 can be configured to perform, via a second scenario and based on the second semantic information, second operation 650 utilizing the data type.

As such, the data type is not bound to a particular form within application 630, e.g., within source code of application 630. In an aspect, the first semantic information and/or the second semantic information can include a characteristic associated with the data type, a property of the data type, a description of the data type, a description of a use of the data type, and/or a format for the data type. For example, application 630 can display structured record(s) corresponding to the data type via client 610 in different ways, e.g., based on a form, form factor, etc. that is associated with a display device of client 610 and defined by the first semantic information, the second semantic information, etc.

In another embodiment illustrated by FIG. 7, application component 625 can include application 710 and application 720. Application 710 can be configured to perform first operation 715 utilizing the data type based on the first semantic information. Further, application 720 can be configured to perform second operation 725 utilizing the data type based on the second semantic information.

In yet another embodiment illustrated by FIG. 8, application component 625 can be communicatively coupled to library component 810 for performing respective operations, e.g., via application 630, application 710, application 720, etc. associated with respective user scenarios. As such, library component can include, be communicatively coupled to, etc. library A 820 and library B 830. Library A 820 can be associated with first operation(s), e.g., a first scenario, one or more display strategies, etc. for a data set, e.g., data set 130, feed 325, etc. and library B 830 can be associated with second operation(s), e.g., a second scenario, etc. for the data set.

Figure 9:
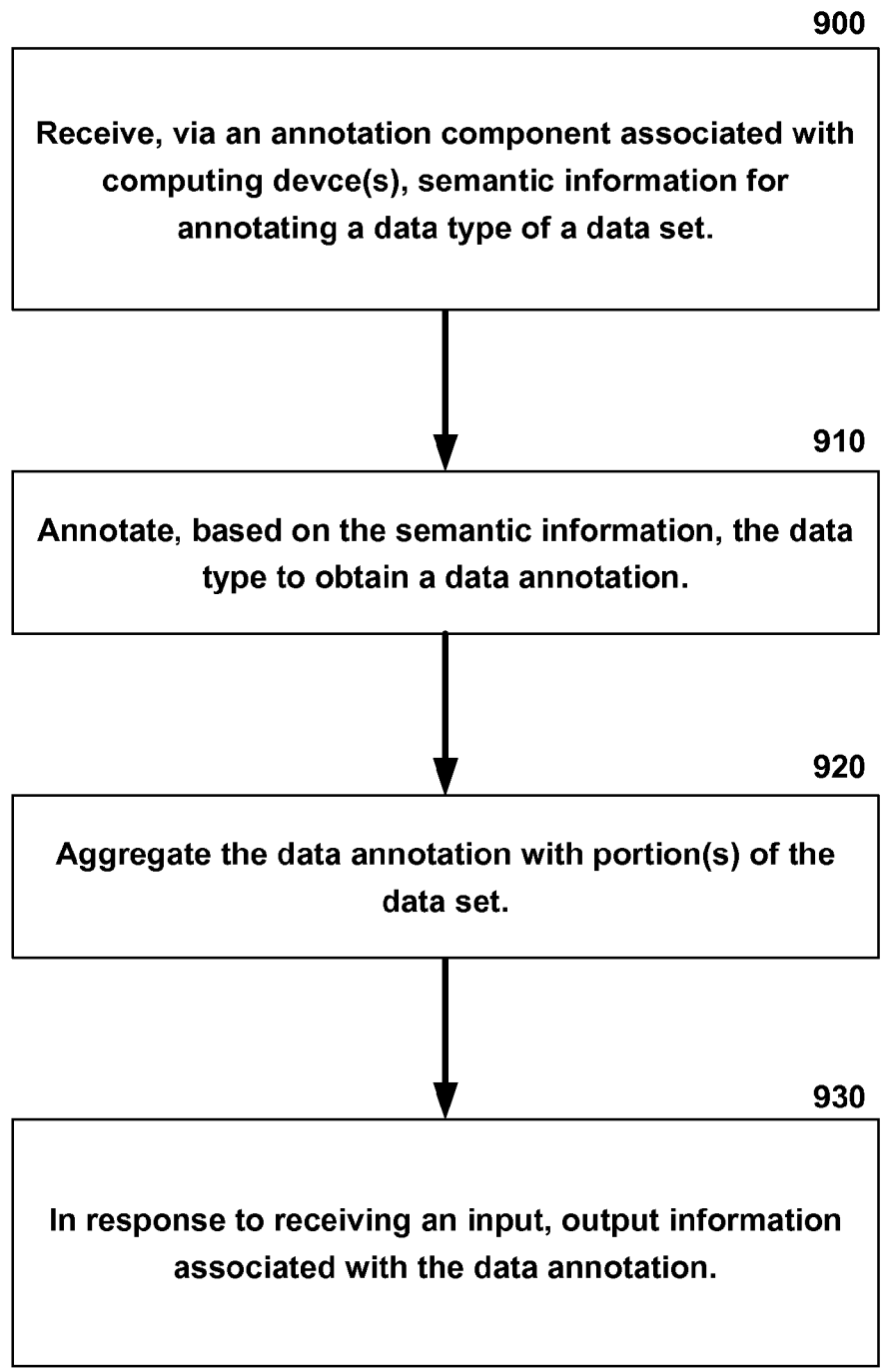
FIGS. 9-10 illustrate exemplary processes according to various embodiments.

FIG. 9 is a flow diagram illustrating an exemplary non-limiting embodiment for assigning semantic meaning to data for a respective scenario. At 900, semantic information for annotating a data type of a data set can be received via an annotation component that is associated with one or more computing devices. At 910, the data type can be annotated based on the semantic information to obtain a data annotation. At 920, the data annotation can be aggregated with portion(s) of the data set. At 930, in response to receiving an input, information associated with the data annotation can be output.

In one embodiment, the semantic information can include a characteristic associated with the data type, a property of the data type, a description of the data type, a description of a use of the data type, and/or a format for the data type. In another embodiment, first semantic information that is associated with a first scenario and second semantic information that is associated with a second scenario can be received via the annotation component.

Figure 10:
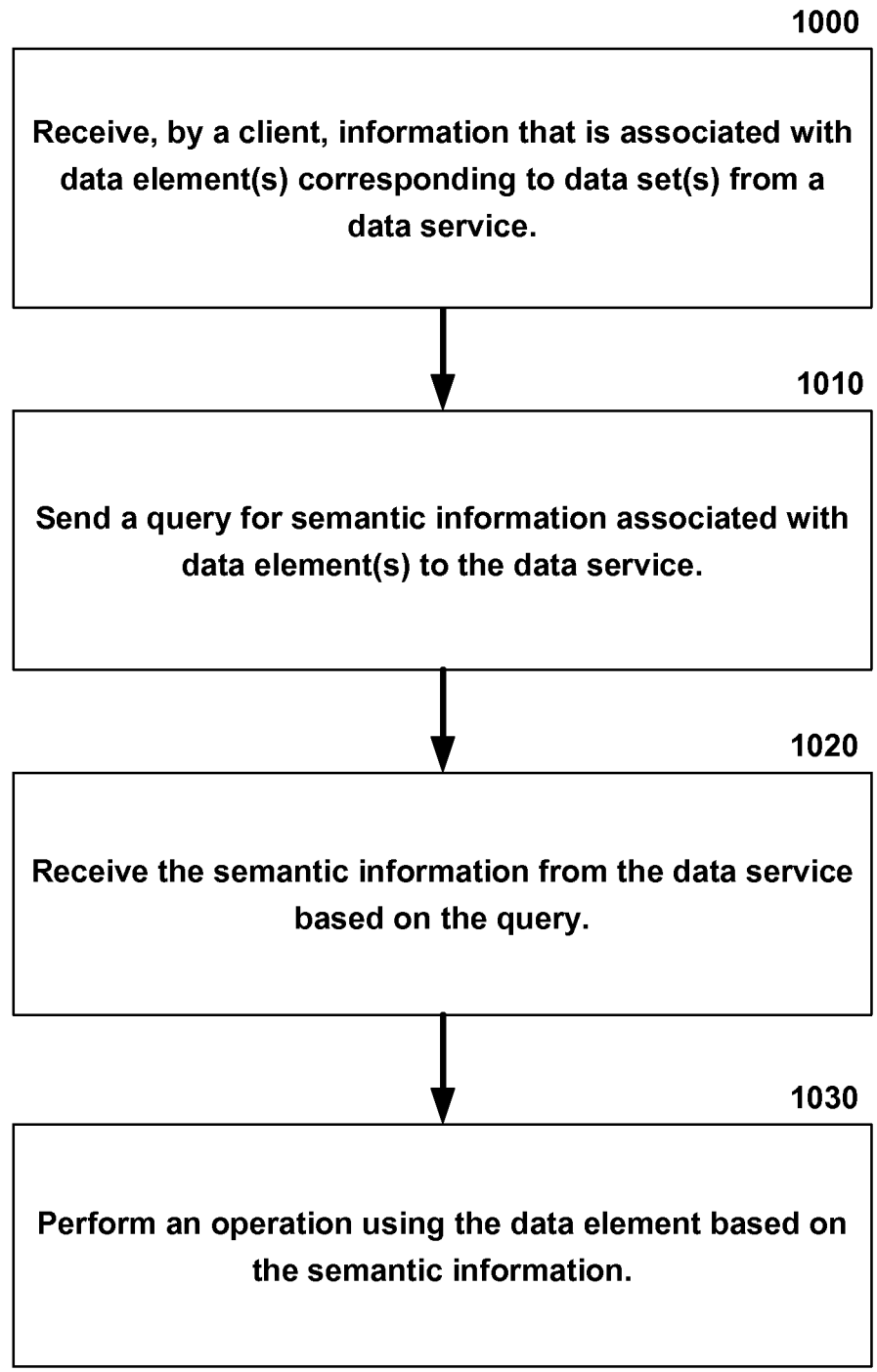

FIG. 10 is a flow diagram illustrating an exemplary non-limiting embodiment for performing an operation based on semantic information. At 1000, information that is associated with data type(s) corresponding to data set(s) can be received, e.g., by a client, client 610, etc. from a data service. At 1010, a query for semantic information associated with the data type(s) can be sent to the data service. At 1020, the semantic information can be received from the data service based on the query. At 1030, an operation can be performed using the data type based on the semantic information.

Exemplary Networked and Distributed Environments

One of ordinary skill in the art can appreciate that the various embodiments for referencing data via disparate semantic annotations based on a respective user scenario described herein can be implemented in connection with any computer or other client, e.g., client A 104, etc. or server, e.g., server 101, server 410, etc. device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms for performing operations associated with referencing data via disparate semantic annotations based on a respective user scenario described for various embodiments of the subject disclosure.

Figure 11:
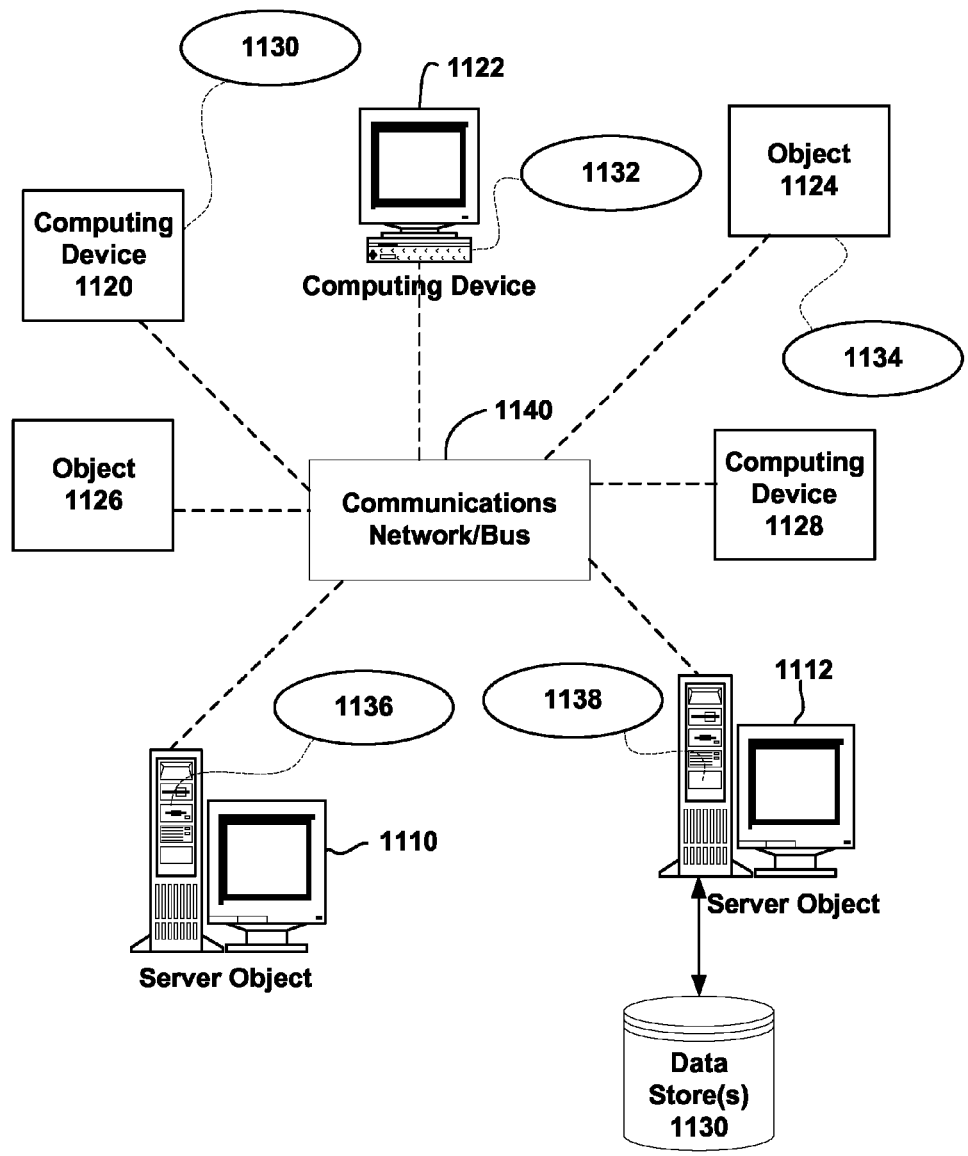
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be noted that computing objects 1110, 1112, etc. and computing objects or devices 1120, 1122, 1124, 1126, 1128, etc. may comprise different devices, such as PDAs, audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques for referencing data via disparate semantic annotations based on a respective user scenario provided in accordance with various embodiments of the subject disclosure.

There are varieties of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for referencing data via disparate semantic annotations based on a respective user scenario as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client, e.g., client A 140, client 610, etc. is usually a computer, that accesses shared network resources provided by another computer, e.g., a server, e.g., server 101, sever 410, etc. In the illustration of FIG. 11, as a non-limiting example, computing objects or devices 1120, 1122, 1124, 1126, 1128, etc. can be thought of as clients and computing objects 1110, 1112, etc. can be thought of as servers in which computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances. Any of these computing devices may be processing data, or requesting transaction services or tasks that may implicate the techniques for referencing data via disparate semantic annotations based on a respective user scenario as described herein for one or more embodiments.

A server, e.g., server 101, server 410, etc. is typically a remote computer system accessible over a remote or local network, such as the Internet or wireless network infrastructures. The client process may be active in a first computer system, and the server process may be active in a second computer system, e.g., related to embodiments associated with FIGS. 1-10 disclosed herein, communicating with one another over a communications medium, thus providing distributed functionality and allowing multiple clients to take advantage of the information-gathering capabilities of the server. Any software objects utilized pursuant to the techniques for referencing data via disparate semantic annotations based on a respective user scenario can be provided standalone, or distributed across multiple computing devices or objects.

In a network environment in which the communications network/bus 1140 is the Internet, for example, e.g., related to embodiments associated with FIGS. 1-10 disclosed herein, the computing objects 1110, 1112, etc. can be Web servers with which the client computing objects or devices 1120, 1122, 1124, 1126, 1128, etc. communicate via any of a number of known protocols, such as HTTP. Servers 1110, 1112, etc. may also serve as client computing objects or devices 1120, 1122, 1124, 1126, 1128, etc., as may be characteristic of a distributed computing environment.

Exemplary Computing Device

Figure 12:
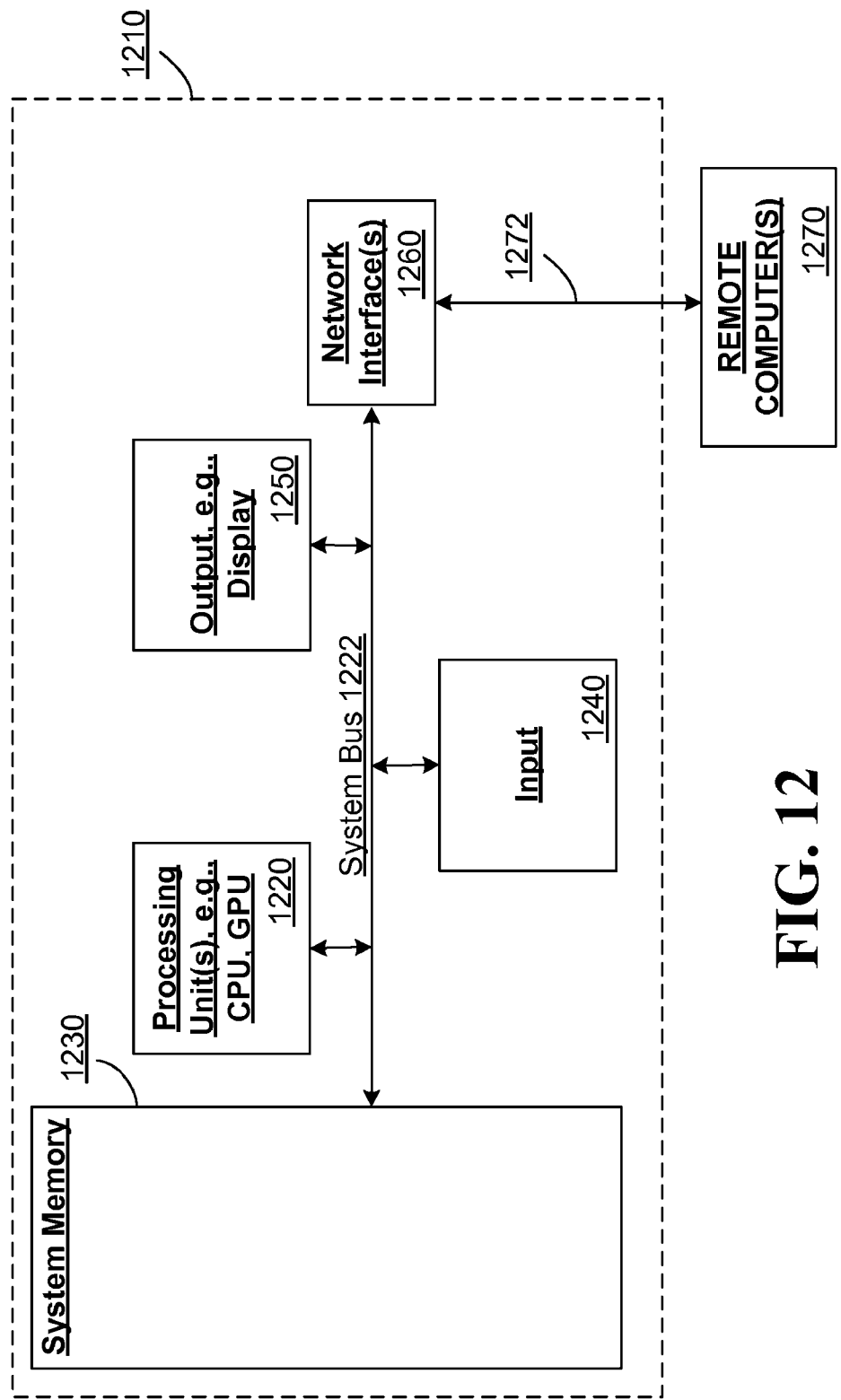
FIG. 12 is a block diagram representing an exemplary non-limiting computing system or operating environment in which one or more aspects of various embodiments described herein can be implemented.

As mentioned, advantageously, the techniques described herein can be applied to any device where it is desirable to reference data via disparate semantic annotations based on a respective user scenario. It is to be understood, therefore, that handheld, portable and other computing devices and computing objects of all kinds are contemplated for use in connection with the various embodiments, i.e., anywhere that a device may wish to access information via a REST-based data service enabling a server to perform operations associated with referencing data via disparate semantic annotations based on a respective user scenario. Accordingly, the below general purpose computer described below in FIG. 12 is but one example of a computing device. Additionally, a server, or a database server, e.g., associated with the service application described above, can include one or more aspects of the below general purpose computer.

Although not required, embodiments can partly be implemented via an operating system, for use by a developer of services for a device or object, and/or included within application software, e.g., the service application described above, that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or more aspects of the embodiments described herein can be implemented, although as made clear above, the computing system environment 1200 is only one example of a suitable computing environment and is not intended to suggest any limitation as to scope of use or functionality. Neither is the computing environment 1200 interpreted as having any dependency or requirement relating to any one or combination of components illustrated in the exemplary operating environment 1200.

With reference to FIG. 12, an exemplary remote device for implementing one or more embodiments includes a general purpose computer, or computing device, in the form of computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

Computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques for referencing data via disparate semantic annotations based on a respective user scenario described herein. Thus, embodiments herein are contemplated from the standpoint of an API (or other software object), as well as from a software or hardware object that implements one or more aspects of such techniques. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be noted that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better noted with reference to the flowcharts of the various figures. While for purposes of simplicity of explanation, the methodologies are shown and described as a series of blocks, it is to be understood and noted that the claimed subject matter is not limited by the order of the blocks, as some blocks may occur in different orders and/or concurrently with other blocks from what is depicted and described herein. Where non-sequential, or branched, flow is illustrated via flowchart, it can be noted that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. Accordingly, the embodiments are not to be limited to any single embodiment, but rather can be construed in breadth, spirit and scope in accordance with the appended claims.

What is claimed is:

1. A system, comprising:
an annotation component, implemented at least partly in hardware, configured to:
receive service semantic information for respective service application programs,
associate the service semantic information with the respective service application programs to obtain respective service annotations, and
in response to reception of a query for service semantic information associated with at least one of the service application programs from a client, send at least a portion of the respective service annotations to the client, a first service annotation of the service annotations indicating a first characteristic of a first action associated with first data that is associated with a first service application program of the service application programs, a second service annotation of the service annotations indicating a second characteristic of a second action associated with second data that is associated with a second service application program of the service application programs that is different from the first service application program, the first data and the second data being same.

2. The system of claim 1, wherein the annotation component is further configured to:
synthesize semantic information for respective data types of one or more data sets,
associate the semantic information with the respective data types to obtain respective data annotations, the semantic information including first semantic information and second semantic information, the first semantic information corresponding to a first operation to be performed utilizing a first data type of the data types, the second semantic information corresponding to a second operation to be performed utilizing the first data type, and in response to receipt of the query from the client, communicate at least a portion of the respective data annotations to the client.

3. The system of claim 2, wherein a data annotation of the respective data annotations indicates a description of a use of the data type.

4. The system of claim 2, wherein a first data annotation of the respective data annotations is associated with a first application of the client and a second data annotation of the respective data annotations is associated with a second application of the client.

5. The system of claim 2, wherein at least one service application program of the service application programs is configured to publish, based on the query, at least a portion of at least one of:

the respective data annotations via extensible markup language (XML); or the one or more data sets via a feed associated with a type definition for a structured record of a data type of the one or more data sets.

6. The system of claim 5, wherein the at least one service application program is further configured to publish, based on the query, at least one of a first link indicative of a file including the XML, or a second link indicative of one or more feeds.

7. The system of claim 2, wherein the annotation component is further configured to:

receive one or more external data annotations; and associate the one or more external data annotations with at least a portion of the respective data types to derive at least a portion of the respective data annotations.

8. A method, comprising:

receiving, via an annotation component of at least one computing device, service semantic information for respective service application programs;

annotating, based on the service semantic information, data that is associated with the service application programs to obtain respective service annotations, a first service annotation of the service annotations indicating a first characteristic of a first action associated with first data that is associated with a first service application program of the service application programs, a second service annotation of the service annotations indicating a second characteristic of a second action associated with second data that is associated with a second service application program of the service application programs that is different from the first service application program, the first data and the second data being same; and in response to receiving an input from a client, outputting information associated with at least one of the service annotations, the input from the client requesting service semantic information associated with at least one of the service application programs.

9. The method of claim 8, further comprising:

receiving, via the annotation component, semantic information for annotating a data type of a data set, the semantic information including first semantic information and second semantic information, the first semantic information associated with a first application of at least one of one or more clients, the second semantic information associated with a second application of at least one of the one or more clients;

annotating, based on the first semantic information and the second semantic information, the data type to obtain a first data annotation and a second data annotation, respectively; and in response to receiving the input, outputting information associated with at least one of the first data annotation or the second data annotation.

10. The method of claim 9, wherein the receiving the semantic information further includes receiving a description of a use of the data type.

11. The method of claim 9, wherein the outputting the information associated with the at least one of the first data annotation or the second data annotation includes publishing the data annotation via an extensible markup language (XML).

12. The method of claim 9, wherein the outputting the information associated with the at least one of the first data annotation or the second data annotation includes publishing the data type via a feed that is associated with a type definition of a structured record of the data type.

13. The method of claim 9, wherein the outputting the information associated with the at least one of the first data annotation or the second data annotation includes publishing a link to at least one of a data feed that is associated with a data service or a file including an extensible markup language describing at least one of the first data annotation or the second data annotation.

14. The method of claim 9, wherein the first semantic information is associated with a first data service and the second semantic information is associated with a second data service.

15. The method of claim 9, wherein the first semantic information is associated with a first application for performing a first operation utilizing the data type; and wherein the second semantic information is associated with a second application for performing a second operation utilizing the data type.

16. A system, comprising:

one or more processors;

an annotation component, implemented using at least one of the one or more processors, configured to:

receive service semantic information for respective service application programs, and associate the service semantic information with the respective service application programs to obtain respective service annotations, a first service annotation of the service annotations indicating a first characteristic of a first action associated with first data that is associated with a first service application program of the service application programs, a second service annotation of the service annotations indicating a second characteristic of a second action associated with second data that is associated with a second service application program of the service application programs that is different from the first service application program, the first data and the second data being same; and the service application programs, at least one of the service application programs configured to output information associated with at least one of the service annotations in response to receipt of an input from a client, the input from the client indicating that service semantic information associated with at least one of the service application programs is requested.

17. The system of claim 16, wherein the annotation component is further configured to annotate a data type of a data set based on first semantic information and second semantic information to obtain a first data annotation and a second annotation, respectively, the first semantic information corresponding to a first operation to be performed utilizing the data type, the second semantic information corresponding to a second operation to be performed utilizing the data type; and wherein a first service application program of the service application programs includes a data aggregation component, the data aggregation component configured to aggregate the first data annotation and the second data annotation with one or more portions of the data set, the first service application program configured to output information associated with at least one of the first data annotation or the second data annotation in response to receipt of the input.

18. The system of claim 17, wherein at least one of the first semantic information or the second semantic information includes a description of a use of the data type.

19. The system of claim 17, wherein the first service application program is configured to publish at least one of the first data annotation or the second data annotation via an extensible markup language (XML).

20. The system of claim 17, wherein the first service application program is configured to publish the data type via a feed that is associated with a type definition of a structured record of the data type.

21. The system of claim 17, wherein the first service application program is configured to publish a link to at least one of a data feed that is associated with a data service or a file including an extensible markup language describing at least one of the first data annotation or the second data annotation.

22. The system of claim 17, wherein the first semantic information is associated with a first data service and the second semantic information is associated with a second data service.

* * * * *